United States Patent [19]

Welsh et al.

[11] 4,090,978

[45] May 23, 1978

[54] ELECTROCATALYSTS AND A METHOD FOR THE PREPARATION THEREOF

[75] Inventors: Lawrence B. Welsh, Evanston; Richard W. Leyerle, Mt. Prospect, both of Ill.

[73] Assignee: UOP Inc., Des Plaines, Ill.

[21] Appl. No.: 755,113

[22] Filed: Dec. 28, 1976

[51] Int. Cl.$^2$ .................... B01J 21/18; B01J 23/40; H01M 4/96

[52] U.S. Cl. .................... 252/425.3; 252/430; 252/447; 427/115; 427/122; 429/44

[58] Field of Search .................... 252/447, 422, 425.3; 423/445, 449; 429/30, 40, 42, 43, 44, 212; 427/115, 122

[56] References Cited

U.S. PATENT DOCUMENTS

| | | | |
|---|---|---|---|
| 3,236,693 | 2/1966 | Caesar | 252/425.3 |
| 3,248,267 | 4/1966 | Langer et al. | 429/42 |
| 3,258,363 | 6/1966 | Lieb | 429/40 |
| 3,446,865 | 5/1969 | Roth et al. | 252/447 |
| 3,793,354 | 2/1974 | Schwager et al. | 252/447 |
| 3,806,466 | 4/1974 | Bird et al. | 252/422 |
| 3,832,306 | 8/1974 | Halkett et al. | 252/447 |
| 3,881,957 | 5/1975 | Hausler | 429/30 |
| 3,979,329 | 9/1976 | Cooper | 252/447 |
| 4,018,943 | 4/1977 | Youtsey et al. | 427/122 |

*Primary Examiner*—Winston A. Douglas
*Assistant Examiner*—P. E. Konopka
*Attorney, Agent, or Firm*—James R. Hoatson, Jr.; Raymond H. Nelson; William H. Page, II

[57] ABSTRACT

Electrocatalysts which may be used in the preparation of electrodes for electrochemical cells such as fuel cells comprise a carbonaceous pyropolymer having the surface thereof impregnated with at least one catalytically active metal. The electrocatalysts may be prepared by treating a refractory inorganic oxide with a pyrolyzable organic compound at pyrolysis conditions to form a carbonaceous pyropolymer on the surface of said refractory inorganic oxide. Thereafter the composite may be impregnated with a soluble salt of at least one catalytically active metal and thereafter the composite may be leached to remove the refractory inorganic oxide. Alternatively, the composite may be leached to remove the refractory inorganic oxide prior to impregnation with the catalytically active metal.

12 Claims, No Drawings

ELECTROCATALYSTS AND A METHOD FOR THE PREPARATION THEREOF

The invention herein described was made in the course of or under a contract or subcontract thereunder with the Department of the Army.

BACKGROUND OF THE INVENTION

This invention relates to electrocatalysts and to a method for the preparation of electrodes for an electrochemical cell as described in U.S. Pat. No. 3,651,386.

An electrochemical cell is basically comprised of an anode and a cathode positioned in an electrolyte and connected in an external circuit, although many variations of the physical arrangement of the three components are possible. An electrochemical cell is a device which permits the performance of oxidation or reduction reactions electrochemically, that is, by way of an electron transfer reaction at an electrodeelectrolyte interface. Oxidation reactions take place at the anode while reduction reactions take place at the cathode.

Electrochemical cells can be classified according to their use. Some produce energy and are called batteries. Others are used to produce chemicals under the use of energy and are called electrolysis cells.

There are a great many different types of energy producing electrochemical cells, such as primary batteries, secondary batteries, fuel cells and batteries which are combinations where one electrode may be a fuel cell electrode, the other a conventional battery electrode, such as is the case in the zinc-air battery.

If the cell is a fuel cell, fuel is supplied from an external source to the anode where it is oxidized, thereby freeing electrons which flow in the external circuit. The oxidation of the fuel also results in the production or neutralization of ions at the anode. These ions pass through the electrolyte to or from the cathode, where they are neutralized or created by oxygen and electrons. Electrodes of a fuel cell may be of the diffusion type, and usually are porous and have at least one surface impregnated with a catalyst, such as the catalyst substance of this invention. Chemical and catalytic action takes place only at the interface between the electrolyte, the reacting gas, and an electrode.

As it is desirable to design an electrochemical cell so as to increase the surface of this interface, the electrodes are often constructed with at least one surface of a porous material and with a hollow interior. The reacting fuel gas and the oxygen are forced into the interior of the pores of the respective electrodes where the gases meet the electrolyte. The electrochemical reactions take place at a three phase boundary area. It is at this boundary area of the anode or cathode that oxidation of the fuel and reduction of the oxygen takes place, thereby producing electricity in the external circuit, and it is this boundary area that has to have catalytic activity.

Fuel cells are often classified on the basis of their mode of operation. Typical high temperature fuel cells which operate at 800° to 1200° C. use solid electrolytes and gaseous fuels. Molten salt electrolytes are used in fuel cells operating at temperatures from 400° to 800° C. They use gaseous fuels also. Low temperature fuel cells operate at temperatures from ambient to 200° or 300° C. use liquid, dissolved or gaseous fuels. The oxidizing agent in most fuel cells is air, although others such as chlorine gas may be used as well. The range of available fuels is much larger. Examples are hydrogen, alcohols, hydrazine, hydrocarbons, and many more. The power which can be obtained from a battery is given by the current which can be drawn under a given voltage. It is characteristic of all chemical energy conversion devices that the voltage difference between the anode and cathode decreases as the current goes up. This voltage decrease is called polarization. Since one always attempts to obtain highest power output possible, one is constantly striving to reduce the polarization of the fuel cell electrodes. This is achieved by increasing the rate of reaction by increasing the temperature of operation or by the use of an electrocatalyst such as is claimed in this invention.

The electrodes are often composed of a structural base section and a catalyst material mounted on the base. The structural base section usually takes the form of conductive screens or gauzes. The electrode is held in place by an electrically conductive holder having an opening. It is upon this opening that the electrode is mounted. The holder is made of electroconductive material, such as copper, silver, carbon and the like. The holder is directly electrically connected to the electric terminal of the external circuit and is hollow with an inlet opening through which fuel or oxygen (air) may be supplied to one side of the electrode. The electrode assembly is located below the surface of the electrolyte such that the other surface of the electrode is in contact with this electrolyte.

A typical gas diffusion electrode used in the manner described above permits the fuel gas or oxygen or air to diffuse into the interior of the pores of the electrode from one side while the electrolyte penetrates the pores from the electrolyte side. In this manner, an extended area or interface for three phase contact is achieved.

This is often brought about by incorporating a certain hydrophobicity to the electrolyte by compacting the catalyst material with a hydrophobic powderous plastic material or by such techniques as spraying one surface with a solution of Teflon, oil, or other polymeric materials, or any other suitable means. Appropriate plastic polymers include porous polytetrafluoroethylene, porous polyethylene, porous polyurethane foams, polystyrene, cellophane, polyvinylidene chloride, polyvinyl chloride, polyvinyl ethyl ether, polyvinyl alcohol, polyvinyl acetate, polypropylene cellulose, polymethyl methacrylate, butadiene-styrene copolymers, styrenated alkyd resins, some poly-epoxide resins, and chlorinated rubber.

The success of an electrochemical cell using a catalyst is fundamentally measured by the cost of producing electricity in the cell. Factors which are determinative of this cost include the temperature at which, for example, a fuel cell must be maintained during operation, the coulombic efficiency at which the fuel is oxidized, the cost of the fuel used, the cost of the catalyst used, and the life or stability of the catalyst, and finally the thermodynamic efficiency.

An important object of fuel cell development is to obtain high discharge voltage at current rates which produce a good watt/pound ratio. This can be achieved if the current-voltage characteristic of the electrode is close to the theoretical Tafel slope and exhibits a minimum of polarization.

The prior art has disclosed various fuel cell electrode catalysts which may be used in an electrochemical cell. For example, U.S. Pat. No. 3,857,737 discloses a fuel cell electrode catalyst comprising a noble metal catalyst such as platinum deposited on particles of an inert carrier such as carbon, the catalyst being prepared by admixing the carbon powder with a salt of platinum to form a slurry followed by concentration and drying. Likewise, U.S. Pat. No. 3,364,074 discloses a carbon-containing electrode which is contacted with an organic solution containing a wetproofing agent for the electrode and an organometallic compound, the electrode then being heated to a temperature sufficient to decompose the organic portion of the organometallic compound to form the desired electrode. Another U.S. patent which discloses an electrochemical cell is U.S. Pat. No. 3,881,957 in which a support such as an inorganic refractory oxide may be preimpregnated with a metal and thereafter the inorganic refractory oxide containing a coating of the catalytic metal is heated in an atmosphere containing an organic pyrolyzable material whereby a pyropolymer is deposited on the surface of the support. However, the electrocatalyst thus prepared possesses a drawback of defect in that the temperature which is required to pyrolyze the organic pyrolyzable substance is of the magnitude of from about 400° to about 900° C., the preferred range being from about 800° to about 900° C. The use of a temperature of this magnitude will agglomerate the metal crystallites and increase the size of the crystal. This increased crystal size may be deleterious to the function of the electrocatalyst due to the fact that the surface of the catalytic metal will be minimized and will therefore decrease the activity of the electrocatalyst. As will hereinafter be shown in greater detail, in contradistinction to this method of preparing an electrocatalyst, the process of the present invention will permit the preparation of an electrocatalyst wherein the catalytic metal is impregnated on the surface of the carbonaceous pyropolymer at temperatures which will minimize the growth of the crystallite size of the metal, and therefore the crystallite size will remain in a desired range.

This invention relates to electrocatalysts and to a method for the preparation thereof, said electrocatalysts being utilized in the formation of electrodes which form an element in an electrochemical cell.

As hereinbefore set forth, electrochemical cells are basically made up of an anode and a cathode which are positioned in an electrolyte and connected in an external circuit, one particular type of electrochemical cell being a fuel cell. The electrodes comprising the anode and cathode which make up one part of said electrochemical cells will contain, as one component thereof, an electrocatalyst. The electrocatalyst which is utilized in the electrode will, of necessity, possess certain desirable characteristics such as stability as well as the ability to improve the performance of the electrochemical cell.

It is therefore an object of this invention to provide an electrocatalyst which will possess the desired properties and which may be used in the formation of electrodes in an electrochemical cell, the electrocatalyst being one element which will function in an efficient manner for a relatively long period of time in a stable manner.

In one aspect an embodiment of this invention resides in a catalytic composition of matter comprising a high surface area carbonaceous pyropolymer impregnated with at least one catalytically active metal.

Another embodiment of this invention is found in the method for the preparation of a catalytic composition of matter which comprises treating a refractory inorganic oxide with a pyrolyzable organic compound at pyrolysis conditions to form a carbonaceous pyropolymer on the surface of said refractory inorganic oxide, impregnating the resulting compound with a soluble salt of at least one catalytically active metal, leaching the resulting composite with an acid or base to remove said refractory inorganic oxide, and recovering the resultant catalytic composition of matter.

Yet another embodiment of this invention resides in a method for the preparation of a catalytic composition of matter which comprises treating a refractory inorganic oxide with a pyrolyzable organic compound at pyrolysis conditions to form a carbonaceous pyropolymer on the surface of said refractory inorganic oxide, leaching the composite with an acid or base to remove said refractory inorganic oxide, thereafter impregnating the remaining carbonaceous pyropolymer with a soluble salt of at least one catalytically active metal, and recovering the resultant catalytic composition of matter.

A specific embodiment of this invention is found in a catalytic composition of matter which comprises a high surface area carbonaceous pyropolymer impregnated with platinum, said platinum being present in a range of from about 5% to about 50% by weight of the carbonaceous pyropolymer.

Another specific embodiment is found in a method for the preparation of a catalytic composition of matter which comprises treating alumina with a pyrolyzable organic compound at pyrolysis conditions to form a carbonaceous pyropolymer on the surface of said alumina, impregnating the resultant compound with a soluble salt of platinum, leaching the resultant composite with phosphoric acid at a temperature in the range of from about ambient to about 250° C. to remove said alumina, and recovering the resultant catalytic composition of matter.

Other objects and embodiments will be found in the following further detailed description of the present invention.

As hereinbefore set forth the present invention is concerned with a method for the preparation of electrocatalysts which may be used in electrodes. Electrocatalysts which are used in acid or alkaline electrolyte fuel cell applications must meet certain requirements, said requirements including electrical conductivity, surface area, wettability of the catalyst by the fuel cell electrolyte, electrochemical stability of the catalyst and the ability of the pyropolymer to resist the sintering or agglomeration of the catalytic metal particles. In this respect the performance of the fuel cell electrocatalysts will be substantially improved when both the particle size of the catalyst particulate and the crystallite size of the catalytic metal or combination of metals are at a minimum value, that is, the smallest grouping of metal atoms which will maintain the metallic properties of larger crystals. The electrocatalyst of the present invention comprises a high surface area carbonaceous pyropolymer having at least one catalytically active metal impregnated thereon. This electrocatalyst will possess a conductivity at room temperature of from about $10^{-8}$ to about $10^{+2}$ inverse ohm-centimeters and will form one element of an electrode for electrochemical cells such as phosphoric acid electrolyte fuel cells, said compositions of matter being used in place of the noble metal impregnated carbon electrocatalysts which have been used in the prior art.

The electrocatalyst of the present invention may be prepared by treating a refractory inorganic oxide of the type hereinbefore set forth, that is, a refractory inorganic oxide possessing a surface area of from 1 to about 500 square meters per gram, with a pyrolyzable organic compound at temperature conditions which are sufficient to pyrolyze the orgnanic compound to form a carbonaceous pyropolymer containing carbon and hydrogen atoms in recurring units. Examples of refractory inorganic oxides which may be treated with the pyrolyzable organic compound will include aluminas such as gamma-alumina, eta-alumina, theta-alumina, silica, alumina-silica, etc. In one method of preparing the composite, the refractory inorganic oxide is heated to a temperature of from about 400° to about 1200° C. in a reducing atmosphere containing an organic pyrolyzable compound. The organic pyropolymer precursors most commonly and preferably used for the purposes of this invention are members of the group consisting of aliphatic hydrocarbons, aliphatic halogen derivatives, aliphatic oxygen derivatives, aliphatic sulfur derivatives, aliphatic nitrogen derivatives, organometallic compounds, alicyclic compounds, aromatic compounds, and heterocyclic compounds. Of the aliphatic hydrocarbons, the more common classes which may be utilized to perform this invention are alkanes, alkenes, alkynes, and alkadienes. Ethane, propane, butane and pentane are among the alkanes which may be successfully used in the performance of this invention. Similarly, alkenes which suffice include ethene, propene, 1-butene, 2-butene, and 1-pentene. Alkynes which may be successfully used include ethyne, propyne, 1-butyne, 2-butyne, 1-pentyne, and 1-hexyne. 1,3-Butadiene and isoprene are included among the alkadienes which may be utilized. Among the aliphatic halogen derivatives which suffice for the purposes of this invention are monohaloalkanes, polyhaloalkanes, and unsaturated halo compounds. In the monohaloalkane subgroup, chloromethane, bromoethane, 1-iodopropane, and 1-chlorobutane may be used. Polyhaloalkanes such as carbon tetrachloride, chloroform, 1,2-dichloroethane, and 1,2-dichlorobutane may also be utilized. One unsaturated halo compound which may be utilized is chloroprene.

The aliphatic oxygen derivatives appropriate for use in this invention include the classes of alcohols, ethers, halohydrides and alkene oxides, saturated aldehydes and ketones, unsaturated aldehydes and ketones, ketenes, acids, esters, salts and carbohydrates. Various alcohols which may be utilized include ethanol, 2-butanol, 1-propanol, glycol, (e.g. 1,3-propanediol), and glycerol. Ethers utilized include ethyl ether and isopropyl ether. Appropriate halohydrins and alkene oxides include ethylene chlorohydrin, propylene chlorohydrin, ethylene oxide, and propylene oxide. Suitable saturated aldehydes and ketones include formaldehyde, acetaldehyde, acetone, and ethyl methyl ketone. Unsaturated aldehydes and ketones which may be used include propenol, trans-2-butenal, and butenone. Ketene has also been successfully used as an organic pyrolyzable substance. Likewise, formic acid, acetic acid, oxalic acid, acrylic acid, chloroethanoic acid, formic anhydride and formyl chloride may also be utilized. Esters such as methyl formate, ethyl formate, and ethyl acetate may also be used. Salts such as sodium formate, potassium acetate, and calcium propionate may be utilized as may a variety of carbohydrates. The broad classification of aliphatic sulfur derivatives may be broken down into the subclasses of alkanethiols, alkylthioalkanes, sulfonic acids, and alkyl sulfates and alkyl metallic sulfates. Suitable among the alkanethiols are ethyl mercaptan and n-propyl mercaptan. Among the alkylthioalkanes usable are the thioethers, alkyl sulfides, methyl sulfide, ethyl sulfide, and methyl propyl sulfide. Ethyl sulfonic acid and n-propyl sulfonic acid are sulfonic acids which may also be successfully used. Ethyl sulfate and sodium laurel sulfate are also appropriate for use.

The broad class of aliphatic nitrogen derivatives may be broken down into the subclasses of nitroalkanes, amides, amines, nitriles, and carbylamines. Nitroethane and 1-nitropropane are exemplary of suitable nitroalkanes while acetamide and propionamide are among the appropriate amides. Amines such as dimethylamine and ethylmethylamine, nitriles such as acetonitrile and propionitrile, and carbylamines such as ethyl isocyanid may also be used for the organic pyrolyzable substance of this invention. Organometallic compounds such as tetraisopropyl titanate, tetrabutyl titanate, and 2-ethylhexyl titanate may also be used.

Particularly appropriate and preferred for use as the organo pyrolyzable substance of this invention are the alicyclic compounds. Foremost among these are cyclohexane and cyclohexene. Aromatic compounds include the subclasses of hydrocarbons, halogen compounds, oxygen derivatives, ethers, aldehydes, ketones, quinones, aromatic acids, aromatic sulfur derivatives, and aromatic nitrogen compounds may also be utilized. Among the many suitable hydrocarbons, benzene, naphthalene, anthracene, and toluene were successfully utilized. Benzyl chloride and benzal chloride are appropriate halogen compounds while phenol, o-cresol, benzyl alcohol and hydroquinone are among the suitable derivatives. Ethers such as anisole and phenetole and aldehydes, ketones, and quinones, such as benzaldehyde, acetophenone, benzophenone, benzoquinone, and anthraquinone may also be used. Aromatic acids such as benzoic acid, phenylacetic acid, and hydrocinnamic acid may be utilized while the aromatic sulfur derivative of benzenesulfonic acid will also serve successfully. The aromatic nitrogen compounds of nitrobenzene, 1-nitronaphthalene, aminobenzene and 2-amine toluene may also be successfully used as the organic pyrolyzable substance of this invention. Among the heterocyclic compounds, five member ring compounds such as furan, proline, coumarone, thionaphthene, indole, indigo, and carbazole may be successfully utilized. Six member ring compounds such as pyran, coumarin and acridine may also be utilized.

As can be seen, an extremely wide latitude can be exercised in the selection of the organic pyrolyzable substance, since virtually any organic material that can be vaporized, decomposed and polymerized on the refractory oxide by heating will suffice.

In another embodiment the composite may be prepared by impregnating the refractory inorganic oxide with a solution of a carbohydrate material such as dextrose, sucrose, fructose, starch, etc., and thereafter drying the impregnated support. After drying, the impregnated support is then subjected to pyrolysis temperatures in the range hereinbefore set forth whereby a carbonaceous pyropolymer similar in nature to those hereinbefore described is formed in at least a monolayer on the surface of the refractory inorganic oxide support.

It has been found that the specific carbon concentration corresponding to a particular conductivity is a function of the pyrolyzable substance used to build the carbonaceous pyropolymer. For example, a carbon concentration of 31.7% in the pyropolymer produced from cyclohexane results in a conductivity of about $4 \times 10^{-3}$ inverse ohm-centimeters, while a carbon concentration of 21.1% in the pyropolymer produced from benzene results in a conductivity of about $4 \times 10^{-2}$ inverse ohm-centimeters. This indicates a difference in the pyropolymer structure as between the pyropolymers produced from different pyrolyzable substances. This difference is due to organic residues not included in the extended, conjugated double-bond structure. Such a difference indicates that extraneous carbon structures may be eliminated from the pyropolymer by a proper choice of starting materials. One particularly advantageous choice is a mixture of benzene and o-xylene. Demethylation of the xylene to produce the benzyl radical or diradical promotes the formation of large aromatic polynuclear networks without extraneous, non-conjugated network elements by providing a large concentration of nucleation radicals. This results in an organic semiconducting material having a high conductivity with a relatively low carbon concentration. Similar results can be achieved using mixtures of o-xylene and naphthalene, o-xylene and anthracene, and halogenated or dihalogenated benzene and benzene, naphthalene or anthracene. It has also been found that the greater the temperature of pyrolysis which is employed, the greater will be the conductivity of the resulting product.

In one embodiment the refractory inorganic oxide support may be ground to the desired size prior to treatment with the organic pyrolyzable compound or, if so desired, the semiconducting material comprising the refractory inorganic oxide containing at least a monolayer of a carbonaceous pyropolymer which consists of recurring carbon and hydrogen atoms on the surface thereof, may be ground to the desired size upon completion of the pyrolysis step of the process. In the preferred embodiment of the invention the particle sizes which are utilized for treatment with the catalytically active metal will range from about 0.1 to about 5 microns in diameter, the preferred size for use in the preparation of an electrode for fuel cells being about 1 micron or less.

In one method of practicing the process of the present invention the novel catalytic composition of matter is prepared by impregnating the pyropolymer composite with a solution of at least one catalytically active metal. The impregnation is effected by treating the composite with an aqueous or organic solution of the desired metal or combination of metals in an amount sufficient to deposit at least one catalytically active metal on the surface of the carbonaceous pyropolymer in an amount ranging from about 0.5 to about 20% by weight. Examples of catalytically active metals and mixture of metals will include platinum, platinum and rhenium, platinum and ruthenium, platinum and tungsten, platinum and nickel, platinum and rhodium, platinum and lead, platinum and germanium, palladium and rhenium, palladium and rhodium, palladium and tungsten, palladium and nickel, palladium and ruthenium, palladium and lead, palladium and germanium, etc. It is to be understood that the aforementioned list of catalytically active metals are only representative of the type of metals which may be impregnated on the surface of the carbonaceous pyropolymer and that the present invention is not necessarily limited thereto.

As hereinbefore set forth the solution which is utilized to impregnate the carbonaceous pyropolymer-inorganic oxide support may be aqueous in nature, specific examples of these being aqueous solutions of chloroplatinic acid, chloroplatinous acid, bromoplatinic acid, sodium platinate, potassium platinate, lithium platinate, platinous chloride, platinic chloride, as well as corresponding solutions of palladium and mixtures of platinum and rhenium, platinum and rhodium, platinum and germanium, platinum and tin, palladium and rhodium, palladium and rhenium, palladium and tin, etc. After impregnation of the composite, the solvent is removed by heating to a temperature in the range of from about 100° to about 400° C., the temperature being that which is sufficient to evaporate said solvent and leave the metal or mixture of metals impregnated on the surface of the carbonaceous pyropolymer. Thereafter the composite may then be dried at elevated temperatures ranging from about 100° to about 200° C. for a period of time ranging from about 2 to about 6 hours or more. The final step in the preparation of the electrocatalyst of the present invention is effected by subjecting the metal impregnated carbonaceous pyropolymer-inorganic refractory oxide composite to a reducing step in the presence of a reducing atmosphere or medium such as hydrogen at elevated temperatures of from about 200° to about 600° C. for a period of time ranging from about 0.5 to 4 hours or more whereby the metallic compound is reduced to the metal in the form of particles. The resulting catalytically active metal impregnated carbonaceous pyropolymer-inorganic refractory oxide composite will contain the catalytic metal or mixture of metals with metal loadings in a range of from about 0.5 to about 20% by weight, the mean particle size of the metal being in a range of from about 10 to about 25 Angstroms or more.

Following the hereinbefore recited steps the base material is then chemically leached from the catalytic composition of matter. The leaching is effected by treating said composite with either an acid or a base thereby forming a high surface area carbonaceous pyropolymer which is impregnated with a catalytically active metal. The leaching of the base material of the type hereinbefore set forth may be effected over a wide range of temperatures, said range being from about ambient (20°-25° C.) to about 250° C. or more for a period of time which may range from about 2 to about 72 hours or more. It is to be understood that the operating parameters of the leaching step will vary over a wide range and will be dependent upon a combination of time, temperature, strength of the leaching solution, etc. Examples of acids or bases which may be utilized to leach out the base material, that is, the refractory inorganic oxide, will include inorganic acids such as phosphoric acid, sulfuric acid, nitric acid, hydrochloric acid, etc.; organic acids such as methylsulfonic acid, ethylsulfonic acid, propylsulfonic acid, toluenesulfonic acid, etc.; strong bases such as sodium hydroxide, potassium hydroxide, lithium hydroxide, rubidium hydroxide, cesium hydroxide, etc. It is to be understood that the aforementioned leaching materials are only representative of the class of compounds which may be used and that any chemical which will be capable of removing the refractory inorganic oxide while (1) retaining the high surface area of the carbonaceous pyropolymer and (2) retaining the small particle size of the catalytically active metal which may be used.

In another embodiment of the invention the novel catalytically active composition of matter may be prepared by forming a carbonaceous pyropolymer on the surface of a refractory inorganic oxide in a manner similar to that hereinbefore set forth. Thereafter this carbonaceous pyropolymer-refractory inorganic oxide composite may then be leached by treatment with either an acid or a base at a temperature in the range hereinbefore set forth to form a high surface area carbonaceous pyropolymer. Thereafter the carbonaceous pyropolymer may then be impregnated with a solution of at least one catalytically active metal in a manner similar to that hereinbefore set forth to form the desired catalytically active composition of matter.

It is also contemplated within the scope of this invention that an alternative method of forming the desired catalytically active composition of matter may be effected by producing a carbonaceous pyropolymer on a refractory inorganic oxide, thereafter impregnating the resulting carbonaceous pyropolymer-inorganic refractory oxide composite with at least one catalytically active metal in the manner hereinbefore taught followed by drying and reducing. Thereafter the composite may then be formed into a porous gas-diffusion type electrochemical cell electrode followed by removal of the refractory inorganic oxide by leaching with an acid or a base. The removal of the inorganic refractory oxide base will result in the formation of an electrocatalyst which possesses increased porosity and available surface area of the catalyst.

The electrocatalyst of the present invention may then be utilized as a component of an electrode for an electrochemical cell such as a fuel cell by admixing the electrocatalyst with a support. The electrode may be prepared by any manner known in the art. For example, the electrocatalyst of the present invention which has been prepared in a manner hereinbefore set forth may be blended with a powder of polytetrafluoroethylene and the resulting mixture may be suspended in a suitable solvent such as water or an alcohol to form a co-suspension which is then deposited in any manner so desired on a substrate. The substrate may comprise any desired compound such as a tantalum screen or a porous graphite, the deposition being accomplished or achieved by screen printing, spraying, filter transfer process, etc. The composite consisting of the substrate with the co-suspension deposited thereon may then be heated at an elevated temperature ranging from about 300° to about 400° C. for a period of time sufficient to sinter the polytetrafluoroethylene which will cause the polytetrafluoroethylene to diffuse and allow the electrocatalyst to adhere to the carrier or substrate. While this is one example of how an electrode for a fuel cell may be prepared, it is contemplated that any other method known in the art may also be employed to prepare the desired composite.

The electrodes thus prepared may be utilized in either alkaline or acid fuel cells. For example, the electrode may be used in an alkaline fuel cell comprising a housing formed of a suitable insulating material such as plexiglas provided with openings for the insertion of conducting wire leads. The housing is provided with a central hollow portion which forms a containment well for the electrolyte material such as sodium hydroxide, ammonium chloride, etc. A zinc anode may be cemented to one interior wall of the containment well. In addition, an air well which possesses a communicating air inlet formed on the top portion of the housing and a communicating air vent formed on the lower portion of the housing is formed within said housing. A cathode comprising an electrode of the type of the present invention may be pressed between the electrolyte well and the air well. Another type of fuel cell which may be employed comprises the acid type fuel cell in which the electrode of the type herein described is affixed to a tantalum screen or a porous graphite current collector which is then placed on each side of a composite matrix. In addition, plates configured for the passage of air, oxygen and hydrogen and containing leads are pressed to the current collector to form the desired fuel cell. Air or oxygen may be passed through the plates to the electrodes which act as cathodes while hydrogen is passed through the plates to the electrodes which are utilized as fuel cell anodes.

As will hereinafter be shown in greater detail in the examples, which are appended to the specification, the catalytic compositions of matter may be utilized as electrocatalysts in electrodes in fuel cells. These examples are given merely for purposes of illustrating the novel catalytic compositions of matter and the method of preparation thereof and are not intended to limit the generally broad scope of the present invention in strict accordance therewith.

EXAMPLE I

A gamma-alumina with a particle size possessing a mean diameter of about 0.5 microns was calcined at a temperature of about 550° C. for a period of about 3 hours. Following this, the alumina powder was placed in a rotary reactor and treated with benzene at a temperature of 800° C. for a period of 0.75 hours.

The material prepared in the above paragraph was then treated with a chloroplatinic acid solution in an amount sufficient to impregnate the material at a platinum level of 10% by weight. Thereafter the mixture was stirred in an evaporating dish for 0.5 hours at ambient temperature and dried in an oven at 100° C. for a period of 4 hours. After drying, the material was reduced by treatment with hydrogen at a temperature of 260° C. for a period of 2 hours in a vertical reactor. The catalytic composition of matter was then utilized to prepare an electrode for use in fuel cells. The catalytic composition of matter was wet blended with a polytetrafluoroethylene powder in an organic medium and after filtration the catalyst layer was formed by a calendering operation. The electrode contained about 20% by weight of polytetrafluoroethylene (Teflon) as a bonding and wet-proofing agent and about 5 mg/cm$^2$ of the electrocatalyst material. The electrode after formation was cut into two square inch pieces and submerged in 100 cc of a 96% phosphoric acid solution which was maintained at a temperature of 140° C. for a period of 24 hours. The effect of this leaching treatment was to leach the alumina from the electrode structure, the remaining electrocatalyst in the electrode contained 34% by weight of platinum. After recovery of the leached electrode, it was washed in boiling deionized water for a period of 4 hours and used in a phosphoric electrolyte fuel cell.

The electrode evaluation was accomplished by forming a fuel cell in which the cell plates comprised a composite material molded from graphite and an acid resistant resin. The cell matrix consisted of a composite structure of Kynol fibers and a phenolic binder, the cell matrix being filled with phosphoric acid which had been pretreated with hydrogen peroxide. The electrodes were placed on each side of the cell matrix and tested as fuel cell cathodes operating on air or oxygen as fuel cell anodes operating on pure hydrogen. The electrodes which, after treatment, contain 46 wt. % of Teflon and had a platinum loading of 0.54 mg/cm$^2$ showed the following results when operating the fuel cell at a temperature of 160° C. with a current density of 100 ma/cm².

TABLE I

| Air Cathode Voltage | | O₂ Cathode Voltage | | | H₂ Anode Voltage | |
|---|---|---|---|---|---|---|
| Terminal | Internal Resistance Corrected | Term. | IRC | O₂ Grain | Term. | IRC |
| 607 | 643 | 700 | 741 | 93 | 653 | 668 |

When the cell performance and reliability of the electrodes were tested at 180° C., the following results were obtained:

TABLE II

| Air Cathode Voltage | | O₂ Cathode Voltage | | | H₂ Anode Voltage | |
|---|---|---|---|---|---|---|
| Terminal | Internal Resistance Corrected | Term. | IRC | O₂ Grain | Term. | IRC |
| 630 | 665 | 701 | 736 | 71 | 673 | 706 |

EXAMPLE II

In a manner similar to that set forth in Example I above, a semiconducting carbonaceous pyropolymeric inorganic refractory oxide material was prepared by treating a gamma-alumina base similar in nature to that used in Example I with a benzene pyropolymer precursor in a rotary reactor at 800° C. After stabilization of the material, 25 grams of said material was admixed with 1.5 liters of a 96% phosphoric acid solution and heated at a temperature of 180° C. for a period of 24 hours. After leaching of the alumina base from the material, the carbonaceous pyropolymer was filtered from the liquid, washed with deionized water and dried at a temperature of 100° C. for a period of 16 hours. Thereafter the carbonaceous pyropolymeric material was commingled with a 28% chloroplatinic acid solution and mixed with 50 grams of deionized water. The mixture was stirred in an evaporating dish for 0.5 hours at ambient temperature and thereafter was evaporated from the material. After evaporation, the impregnated carbonaceous pyropolymeric material was dried in an oven at 100° C. and reduced by treatment with flowing hydrogen at a temperature of 260° C. for a period of 2 hours. The platinum concentration of the finished electrocatalyst was 13 percent by weight. X-ray analysis of the finished electrocatalyst showed that 35% of the platinum particles had mean diameters over 15 to 20 A (termed agglomerated) and the mean diameter of those particles was 21 A. The surface area of the platinum in the electrocatalyst was above 140 m²/g.

The catalytic composition of matter which was prepared in the above paragraph may then be fabricated into a fuel cell electrode in a manner similar to that set forth in Example I above and may be tested as an air and oxygen cathode as well as a hydrogen anode in a phosphoric acid fuel cell.

EXAMPLE II

A catalytic composition of matter was prepared by forming a semiconducting carbonaceous pyropolymeric inorganic refractory oxide material, impregnating this material with platinum and thereafter leaching the catalytic composition of matter to remove the alumina base therefrom at a temperature of 180° C. with phosphoric acid for a period ranging up to 340 hours. In addition, a second catalytic composition of matter was prepared by impregnating carbon black with platinum and subjecting this composition of matter to a leaching procedure similar to that hereinbefore described. The sintering effect on the platinum which was present in both catalysts was studied by X-ray analysis with the following results:

TABLE IV

| Catalyst | Time (Hrs) | Before Leaching Pt Impreg Level (wt %) | After Leaching Pt on Carbon (wt %) | (1) Particle Size (A) | (2) Ag (%) | S.A. (m²/g) |
|---|---|---|---|---|---|---|
| Catalyst of the present invention | 0 | 5 | 12.3 | 69 | 26 | 116 |
| | 1 | 5 | 12.3 | 59 | 20 | 121 |
| | 24 | 5 | 12.3 | 56 | 28 | 115 |
| | 170 | 5 | 12.3 | 63 | 37 | 105 |
| | 340 | 5 | 12.3 | 65 | 34 | 105 |
| Carbon Black | 0 | 10 | 10 | 45 | 10 | 132 |
| | 1 | 10 | 10 | 43 | 34 | 115 |
| | 24 | 10 | 10 | 49 | 42 | 105 |
| | 170 | 10 | 10 | 55 | 30 | 113 |
| | 340 | 10 | 10 | 65 | 49 | 87 |

(1) Mean diameter of all platinum particles over 15 to 20 A diameter
(2) Agglomeration, the percentage of platinum atoms in particles over 15 to 20 A in diameter It is noted from the above table that the catalyst of the present invention showed a relatively small loss of surface area with a relatively small gain of agglomeration of the platinum particles. In contradistinction to this, the catalyst which used carbon black as the base rather than the carbonaceous pyropolymer of the present invention showed a relatively sharp decrease in the surface area of the catalyst as well as a relatively large increase in the percent of agglomeration of the platinum particles.

EXAMPLE IV

In a manner similar to that set forth in the above examples, an alumina which has a particle size possessing a mean of about 0.5 microns may be calcined at a temperature of about 500° C. for a period of about 3 hours. Thereafter the alumina may be placed in a rotary reactor and treated with benzene at a temperature of about 800° C. After recovery of the resulting semiconducting carbonaceous pyropolymeric inorganic refractory oxide material, the material is then treated with a soluble chloropalladic acid in an amount sufficient to impregnate the carbonaceous pyropolymer at a palladium level of about 10% by weight. After drying the material at a temperature of about 100° C., it may then be reduced by treatment with hydrogen at an elevated temperature of about 250° C. Thereafter the material may be leached by treatment with sulfuric acid at a temperature of about 100° C. for a period of about 20 hours. The solid material is recovered by filtration and treated with deionized water at a temperature above 100° C. for a period of about 4 hours. Thereafter the catalytic composition of matter may then be formed into an electrode for use in fuel cells.

In a manner similar to that set forth in the above examples, novel catalytic compositions of matter of the present invention may be prepared by treating the carbonaceous pyropolymeric inorganic refractory oxide material resulting from the treatment of gamma-alumina or silica with a pyropolymer precursor such as cyclohexane, benzene, n-hexane, etc., at pyrolysis conditions and treating the resultant carbonaceous pyropolymeric inorganic refractory oxide material with soluble solutions of platinum and rhenium, platinum and rhodium, palladium and ruthenium, etc., followed by leaching of the impregnated material with phosphoric acid at a temperature of about 180° C. to remove the refractory inorganic oxide such as alumina or silica. Thereafter the catalytic composition of matter comprising the carbonaceous pyropolymer which is impregnated with the catalytically active metals may then be utilized in the formation of electrodes for fuel cells.

We claim as our invention:

1. An electrocatalyst which may be used in the preparation of an electrode for an electrochemical cell prepared by the steps which comprises:
   (a) treating a refractory inorganic oxide having a surface area from 1 to 500 square meters per gram with an organic pyrolyzable compound in a reducing atmosphere at a temperature of from about 400° to about 1200° C to pyrolyze said organic compound to form a carbonaceous pyropolymer having a conductivity at room temperature of from about $10^{-8}$ to $10^2$ inverse ohm-centimeters on the surface of said refractory inorganic oxide;
   (b) leaching said carbonaceous pyropolymer depositedrefractory inorganic oxide with an acid or base to remove said refractory inorganic oxide;
   (c) impregnating the remaining carbonaceous pyropolymer with a soluble salt of at least one catalytically active metal; and
   (d) recovering said electrocatalyst.

2. The catalytic composition of matter of claim 1 in which said catalytically active metal is present in said composite in a range of from about 5% to about 50% by weight of the carbonaceous pyropolymer.

3. The catalytic composition of matter of claim 1 in which said catalytically active metal is platinum.

4. The catalytic composition of matter of claim 1 in which said catalytically active metal is palladium.

5. The catalytic composition of matter of claim 1 in which said catalytically active metals are platinum and rhenium.

6. The catalytic composition of matter of claim 1 in which said catalytically active metals are platinum and rhodium.

7. The catalytic composition of matter of claim 1 in which said catalytically active metals are palladium and ruthenium.

8. The catalytic composition of matter prepared by the steps of claim 1 in which said refractory inorganic oxide is alumina.

9. The catalytic composition of matter prepared by the steps of claim 1 in which said refractory inorganic oxide is silica.

10. The catalytic composition of matter prepared by the steps of claim 1 in which said leaching is effected at a temperature in the range of from about ambient to about 250° C.

11. The catalytic composition of matter prepared by the steps of claim 1 in which said refractory inorganic oxide is leached by treatment with phosphoric acid.

12. The catalytic composition of matter prepared by the steps of claim 1 in which said refractory inorganic oxide is leached by treatment with sulfuric acid.

* * * * *